Pelton & Brewer,
Lubricator.
N° 49,148. Patented Aug. 1, 1865.
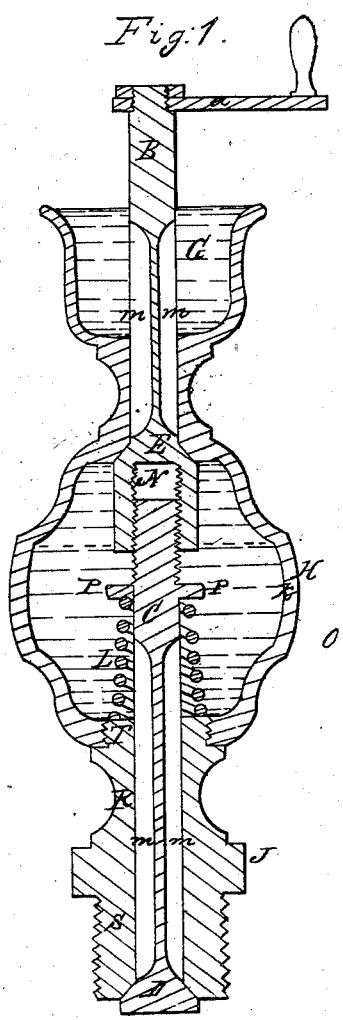
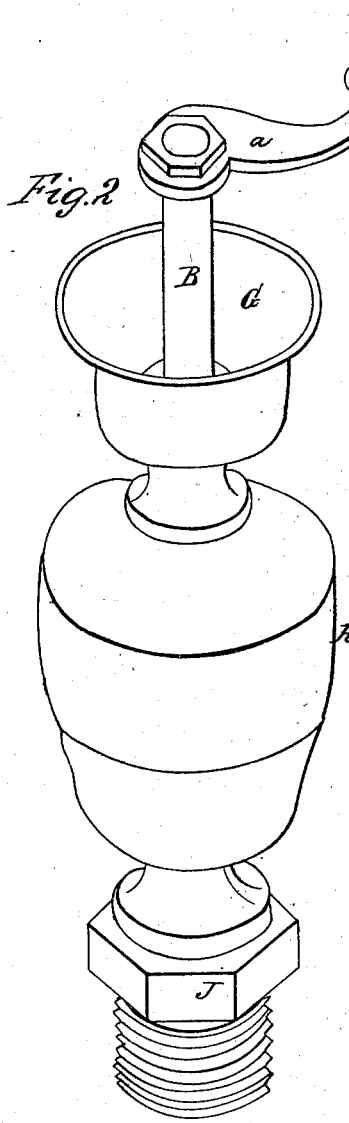
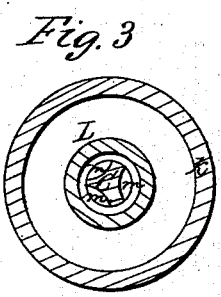
Witnesses:
W. W. Sanborn
M. Reese
Inventors:
Theodore G. Pelton
James Brewer

UNITED STATES PATENT OFFICE.

THEODORE G. PELTON, OF LYONS, IOWA, AND JAMES BREWER, OF ALBANY, ILLINOIS.

IMPROVEMENT IN LUBRICATORS.

Specification forming part of Letters Patent No. 49,148, dated August 1, 1865.

*To all whom it may concern:*

Be it known that we, THEODORE G. PELTON, of Lyons, Clinton county, and State of Iowa, and JAMES BREWER, of Albany, Whitesides county, and State of Illinois, have invented a new and Improved Oil Cup for Steam and Caloric Engines, &c.; and we do hereby declare that the following is a full, clear, and exact description of the construction and operation of the same, reference being had to the annexed drawings, making a part of this specification, in which—

Figure 1 is a vertical central section through our oil-cup; Fig. 2, a perspective view, and Fig. 3 a transverse section through the line O of Fig. 1.

It is particularly desirable in the construction of oil-cups to retain the lower valve in its seat independently of the pressure of the steam, and so arrange both valves that they shall be closed at the same time or that either one can be opened while the other is closed. This is the object of our invention, which therefore consists, first, in making the valve-stem in two parts, so arranged that both the upper and lower valve may be held to their several seats by an internal spring, or the upper one opened while the lower one is closed, or vice versa, by a winch or crank-handle; and, second, in arranging grooves in the stem for the passage of the oil out from the cup to the globe and from the globe to the cylinder without so diminishing the diameter of the stems as to permit them any lateral vibration when in place.

In the accompanying drawings we have represented in its outward form an oil-cup of the usual construction, having an oil-cup, G, globe H, nut J, and screw S, to hold it firmly in place, as shown in Figs. 1 and 2. It is obvious that these parts can be made of any suitable metal, and that the cup, globe, nut, and screw may be cast together, or the cup and globe may be screwed to the standard above the nut and screw, as at T, or all may be cast in semi-diameters and united.

We construct our valve-stem in two parts, B and C, the upper one, B, having a crank-handle or winch, *a*, firmly secured to its top, and a female screw at its lower end, with a valve, E, on its outside, fitting the upper valve-seat, E'. The lower valve-stem, C, has a screw on the top to fit the female screw in the upper stem, both screws being shown at N, and a collar or pin, P, just beneath the screw. The lower end of this portion of the stem carries the lower valve, D, which fits perfectly in its seat D'. That portion of the valve-stem which passes through the neck between the oil-cup and globe and through the lower section, R, of the base of the cup is grooved on three sides with grooves *m* in Figs. 1 and 3, of sufficient capacity to permit the oil to flow freely from one compartment to the other.

Resting on the base of the globe H, and surrounding the stem, we place a spiral spring, L, which bears with sufficient strength against the collar or pin P to keep the lower valve always closed, except when opened by the winch to permit the oil to pass from the globe to the cylinder.

The operation is as follows: The valves being closed, as in Fig. 1, the oil-cup G is filled with oil, and the winch is turned from left to right until the female screw of the stem passes down on the male screw far enough to open the upper valve, when the oil will pass through the grooves *m* into the globe. The motion of the winch in now reversed, when the upper valve will be closed, and the male screw will now be forced down on the spring and the lower valve will be opened, and the oil from the globe will pass through the grooves in the stem to the cylinder without the possibility of blowing any oil out of the globe or cup.

It is obvious that when the male and female screws are properly adjusted both valves will be held closed by the spiral spring, and that the winch gives a perfect control over the alternate opening and closing either valve, as the use of our oil-cup may require.

What we claim as our invention, and desire to secure by Letters Patent of the United States, is—

1. Making the valve-stem for oil-cups in two parts, when constructed and arranged and operating substantially in the manner described.

2. In combination with the valve-stem, constructed substantially as described, the spiral spring L and collar or pin P, as and for the purpose set forth.

3. In combination with the stem, constructed substantially as described, the grooves *m*, as and for the purpose specified.

In witness whereof we have hereunto signed our names.

THEODORE G. PELTON.
JAMES BREWER.

Witnesses:
WM. W. SANBORN,
M. REEVE.